May 27, 1930.                  F. S. CARR                  1,760,267
                          UPHOLSTERY INSTALLATION
                            Filed Jan. 9, 1926
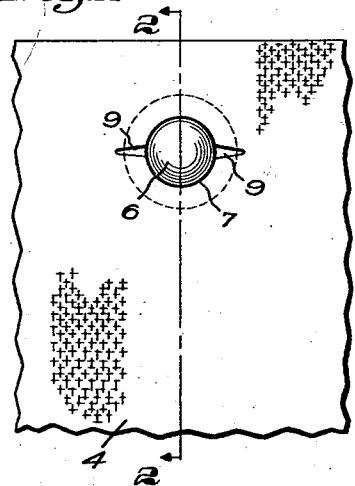
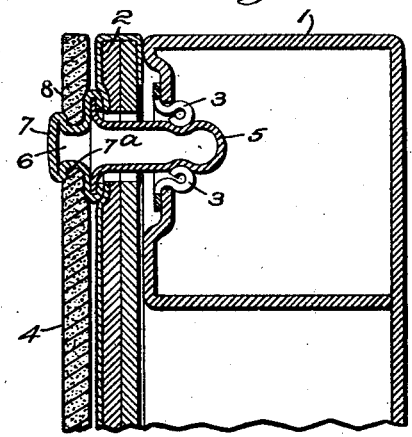
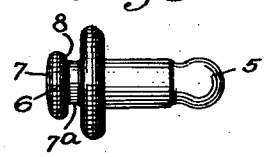
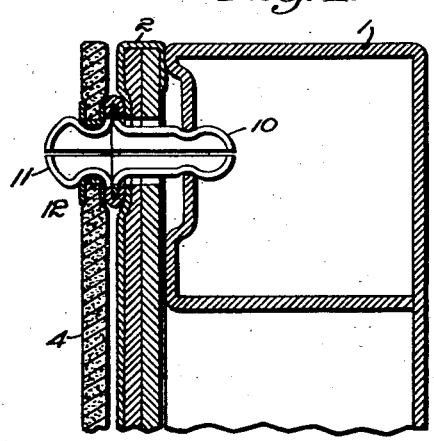
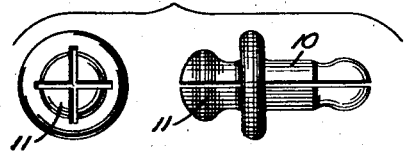
Inventor:
Fred S. Carr,
by Emery Booth Janney Varney
Attys.

Patented May 27, 1930

1,760,267

UNITED STATES PATENT OFFICE

FRED S. CARR, OF NEWTON, MASSACHUSETTS; MOSES F. CARR, EXECUTOR OF SAID FRED S. CARR, DECEASED, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

UPHOLSTERY INSTALLATION

Application filed January 9, 1926. Serial No. 80,190.

This invention aims to provide improvements in upholstery installations.

In the drawings which illustrate preferred embodiments of my invention:

Fig. 1 is an elevation of a portion of an upholstery installation showing a slip cover held in place by a fastening element used also to secure the upholstery to a frame;

Fig. 2 is a section on the line 2—2 of Fig. 1 showing the fastening means;

Fig. 3 is a side elevation of a combined stud unit;

Fig. 4 is a section similar to Fig. 2 but showing the use of a resilient stud unit instead of a rigid unit; and Fig. 5 includes a front and a side elevation of the stud unit shown in Fig. 4.

Referring to the drawings I have shown simple, inexpensive and durable means for securing upholstery coverings and slip covers to frames.

The frame 1, the upholstered unit or covering 2 and the socket element 3 carried by the frame 1 are all substantially the same as shown and described in my copending application Serial No. 11,262, filed herewith. In addition to the above I have provided a slip cover 4 and means for securing the slip cover to the upholstery as shown in Figs. 1 and 4.

Heretofore the usual method of securing slip covers to a removable upholstered part was to provide fastening means which secured the upholstery to the frame. I have found, however, that labor and expense can be reduced by combining one of the fastener elements for securing the upholstery to the frame with one of the fastener elements which secure the slip cover to the upholstery.

Referring to Figs. 1 through 3 I have shown a stud unit which includes a rigid stud part 5 having a head, a neck and a shank portion for passage through the upholstery covering 2 to engage the socket 3, presented by the frame, to secure the upholstery in place substantially as described in the above mentioned copending application. To the base of the stud part 5 I have secured a somewhat shorter rigid stud part 6 having a flat head 7, a neck 7ª and a relatively abrupt shoulder 8 for cooperative engagement with an inlet or buttonhole 9 thereby to secure the slip cover in place, as shown in Figs. 1 and 2.

Figs. 4 and 5 illustrate another preferred fastener unit which includes two stud members 10 and 11 secured together in the same manner as shown in Figs. 1 through 3. In this instance however I have shown contractible and expansible stud members for cooperation with sockets having stud receiving apertures of fixed dimensions. The socket in the frame 1 may be provided by a plain hole, while the socket for cooperation with the stud 11 may be a simple grommet 12 secured to the slip cover as shown in Fig. 4.

Obviously the intermediate fastening unit may be made in several different forms without effecting the simplicity with which upholstery and slip covers may be secured to frames.

While I have shown and described preferred embodiments of my invention it will be understood that changes involving omission, substitution, alteration and reversal of parts and even changes in the mode of operation may be made without departing from the scope of my invention which is best defined in the following claim.

Claim:

A combined upholstery and slip cover installation comprising, in combination, a frame, an upholstered unit covering said frame, a slip cover covering the upholstered unit and separable fastening means securing all of the said parts together, said separable fastening means including socket means presented by said frame and a combination stud unit securing said slip cover to said upholstery covering, said stud unit comprising a stud part having a relatively long shank passing through said upholstery covering and having a neck engaging the socket means presented by said frame and a relatively shorter stud part secured to said first mentioned stud part and extending in the opposite direction therefrom and fastened by stud-engaging means to the slip cover.

In testimony whereof, I have signed my name to this specification.

FRED S. CARR.